United States Patent [19]

Okuda et al.

[11] Patent Number: 4,718,139
[45] Date of Patent: Jan. 12, 1988

[54] AUTOMOTIVE WIPER DEVICE WITH ADJUSTABLE WIPER BLADE FORCE

[75] Inventors: Haruo Okuda, Warabi; Yukiho Murata, Zama, both of Japan

[73] Assignees: Nissan Motor Company Limited, Yokohama; Ichikoh Industries Limited, Tokyo, both of Japan

[21] Appl. No.: 903,474

[22] Filed: Sep. 4, 1986

[30] Foreign Application Priority Data

Sep. 6, 1985 [JP] Japan .................... 60-196002

[51] Int. Cl.⁴ .................................... B60S 1/34
[52] U.S. Cl. .................... 15/250.2; 15/250.34; 15/250.35
[58] Field of Search ............ 15/250.19, 250.2, 250.34, 15/250.35

[56] References Cited

U.S. PATENT DOCUMENTS

| | | | |
|---|---|---|---|
| 4,472,854 | 9/1984 | Bauer et al. | 15/250.2 |
| 4,497,084 | 2/1985 | Auzolat | 15/250.35 |
| 4,545,088 | 10/1985 | Kohler et al. | 15/250.34 |

FOREIGN PATENT DOCUMENTS

| | | | |
|---|---|---|---|
| 44550 | 3/1982 | Japan | 15/250.2 |
| 167349 | 9/1984 | Japan | 15/250.2 |
| WO85/03044 | 7/1985 | PCT Int'l Appl. | |
| 558640 | 1/1944 | United Kingdom | |
| 642188 | 8/1950 | United Kingdom | |
| 641526 | 8/1950 | United Kingdom | |
| 827427 | 12/1956 | United Kingdom | |
| 1230935 | 5/1971 | United Kingdom | |
| 2021938 | 12/1979 | United Kingdom | |
| 2097661 | 11/1982 | United Kingdom | |

*Primary Examiner*—Peter Feldman
*Attorney, Agent, or Firm*—Schwartz, Jeffery, Schwaab, Mack, Blumenthal & Evans

[57] ABSTRACT

A novel and useful automotive wiper device, of which the depression force can be adjusted with a compact mechanism for adjusting the depression force of the wiper blades. The automotive wiper device employs a plurality of springs exerting a biasing force on a wiper arm and a wiper blade against a vehicular window surface. At least one of the springs has an adjustable spring force. The adjustable spring is associated with an adjusting means which allows adjustment of the spring force thereof.

13 Claims, 7 Drawing Figures

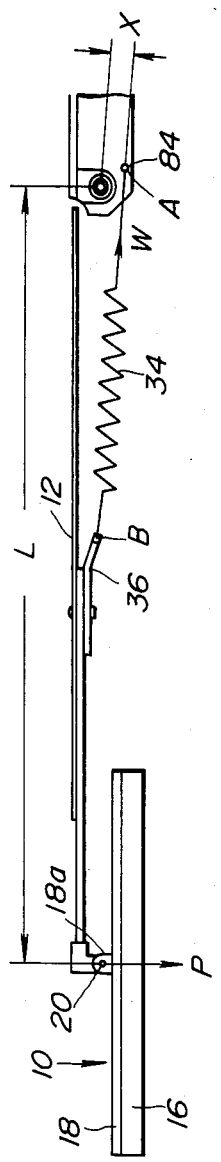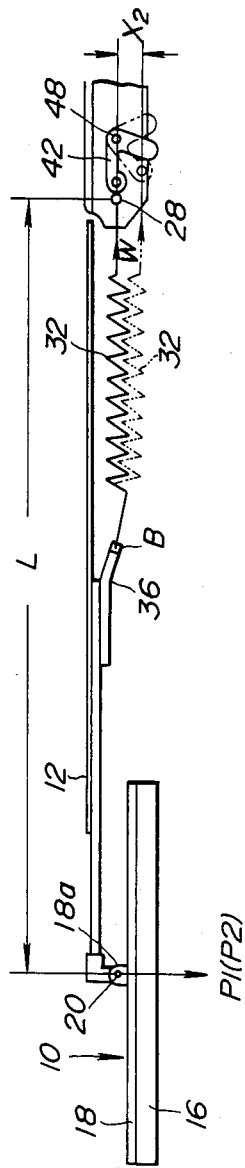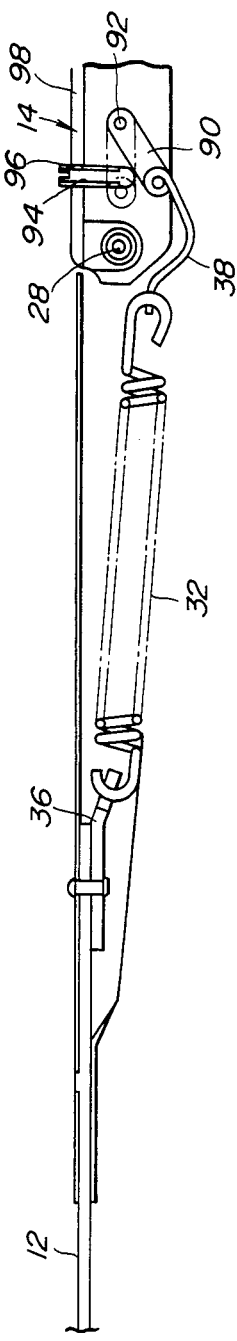

AUTOMOTIVE WIPER DEVICE WITH ADJUSTABLE WIPER BLADE FORCE

BACKGROUND OF THE INVENTION

The present invention relates generally to an automotive wiper device. More specifically, the invention relates to a wiper device with adjustable force of depression against the windshield. Further specifically, the invention relates to an adjustable-force wiper device which can be adjusted linearly.

As is well known, automotive wiper devices include wiper blades mounted on the ends of wiper arms. Springs seated between the wiper blades and the wiper arms exerted a spring force depressing the wiper blades against window surfaces. So that the wiper blades can effectively wipe away rain water, washer liquid and so forth, the force of depression of the wiper blades against the window surface must be adequate. The required depression force varies with vehicle driving conditions. For example, when the vehicle is moving at high speed or into a strong wind, a greater depression force is required so as to prevent the wiper blade from being lifted off the window surface. On the other hand, when the vehicle is moving at a relatively low speed, i.e. when the wiper blade is not subjected to a powerful air flow, less depression force is required. If the depression force is adjusted to be sufficient to prevent the wiper blade from being lifted off during high-speed travel, the depression force may be excessively high, which would accelerate wear on the wiper blade and so shorten its lifetime and may increase the chance of scratching the window surface. On the other hand, when the wiper blade depressing force is adjusted for normal, relatively low-speed driving, the wiper blades will tend to be displaced and so may not effectively wipe away rain water, washer liquid and so forth from the window surface.

Therefore, it would be advantageous to allow adjustment of the depression force of automotive wiper devices so that the depression force of the wiper blades can be adjusted according to the vehicle driving conditions. It would be preferable to allow adjustment of the depression force of the wiper blades by remote control from the vehicle cabin. Furthermore, in order to allow remote control of the depression force of the wiper blades, it would be best for the depression force to vary linearly.

SUMMARY OF THE INVENTION

Therefore, it is an object of the invention to provide a novel and useful automotive wiper device, of which the depression force can be controlled remotely.

Another object of the invention to provide an automotive wiper device with a compact mechanism for adjusting the depression force of the wiper blades.

In order to accomplish the above-mentioned and other objects, an automotive wiper device, according to the present invention, employs a plurality of springs exerting a biasing force on a wiper arm and a wiper blade against a vehicular window surface. At least one of the springs has an adjustable spring force. The adjustable spring is associated with an adjusting means which allows adjustment of the spring force thereof.

With the construction set forth above, the spring force of the non-adjustable spring or springs is exerted between fixed points on said wiper arm and an arm head. Assuming the spring load due to the non-adjustable spring is W, the length of the wiper arm is L and the component of the distance between the spring anchor on the arm head and the pivot point between the wiper arm and the arm head perpendicular to the spring axis (normal distance) is X, the depression force P exerted on the wiper blade by the non-adjustable spring can be expressed by the following equation:

$$P = W(X/L)$$

Similarly, assuming the normal distance between the point of connection of between the end of the adjustable spring and the actuation means therefor and the pivot point between the wiper arm and the arm head is $x_1$, the depression force $P_1$ exerted on the wiper blade thereby can be expressed by the following equation:

$$P_1 = W(x_1/L)$$

As will be clear herefrom, the depressing force exerted on the wiper blade will vary as a function of the distance between the actuator-spring connection and the aforementioned spring anchor point. Therefore, if an adjustable spring alone is used to depress the wiper blade against the window surface, it would be necessary for the distance between the points mentioned to be great enough. This would prevent the wiper arm head 14 from being compact. The shown embodiment thus employs a plurality of springs which includes non-adjustable spring or springs and adjustable spring or springs. Therefore, when the actuation means is not active, i.e., the points are in an initial relationship with a initial normal distance $x_1 = \phi$ so that the total depression on the wiper blade will be approximate equal to that due to the normal distance X between the spring anchor points of the non-adjustable spring. Therefore the depression force exerted on the wiper blade would be P. By shifting the actuator anchor point of the adjustable spring, the normal distance $X_1$ can be adjusted up to $x_2 = X$ so that the adjustable depression force could reach P. This increased depression force would of course be added to the non-adjustable spring force exerted to the wiper blade. In other words, the sum of the force P and $P_1$ would be exerted on the wiper blade. Therefore, the force $P_1$ can be relatively small, so that $X_1$ also can be relatively small. This helps keep the arm head thin and thus allows the latter to be compact.

According to one aspect of the invention, an automotive wiper device with adjustable depression force comprises a wiper blade, a wiper arm supporting the wiper blade at one end, an arm head connected to the other end of the wiper arm for pivotally driving the wiper arm so as to actuate the wiping operation, a bias means, connected to the wiper arm and the arm head, for biasing the wiper arm and the wiper blade toward an associated vehicular window surface, the biasing means comprising a plurality of springs exerting a biasing force on the wiper arm, the plurality of springs including at least one adjustable spring, and adjusting means, cooperating with the adjustable spring, for adjusting the biasing force exerted by the adjustable spring.

Preferably, each of the springs is connected at one end to a fixed point on the wiper arm and connected at the other end to the arm head, the the other end of the springs other than the adjustable spring, being connected to a fixed point on the arm head, and wherein the adjusting means comprises a movable member associated with the other end of the adjustable spring so as to for adjusting the normal distance and thereby adjusting the biasing force on the wiper arm. The movable member of the adjusting means is pivotally supported by the arm head.

The adjusting means may further comprise an actuation means associated with the movable member for causing pivotal movement of the movable member. The movable member comprises an essentially L-shaped lever pivoted at the juncture of essentially straight first and second sections, the first section being connected to the other end of the adjustable spring and the second section being connected to the actuation means. The actuation means comprises a driving motor and a rod member adapted to be driven axially so as to actuate the second section of the L-shaped lever pivotally. The actuation means may further comprises a converter means for converting the rotational driving force of the driving motor into energy for driving the rod member axially.

In the alternative embodiment, the movable member comprises a straight lever pivotably secured to the arm head at one end and connected at the other end to the other end of the adjustable spring. The actuation means comprises a driver screw, threaded into the arm head and in contact with one edge of the straight lever, for adjusting the straight lever position by axially movement through the arm head.

According to another aspect of the invention, a method for adjusting depression force to be exerted on a wiper blake in an automotive wiper device comprising the wiper blade, a wiper arm supporting the wiper blade at one end, an arm head connected to the other end of the wiper arm for pivotally driving the wiper arm so as to actuate the wiping operation, and a bias means, connected to the wiper arm and the arm head, for biasing the wiper arm and the wiper blade toward an associated vehicular window surface, which method comprises:

providing a plurality of springs in the biasing means, the plurality of springs including at least one adjustable spring;

exerting a biasing force on the wiper arm for depressing the wiper against the associated vehicular window by means of the plurality of springs; and adjusting the biasing force exerted by the adjustable spring.

Preferably, the method as set forth above further comprises a step of connecting each of the springs at one end to a fixed point on the wiper arm and connected at the other end to the arm head, the the other end of the springs other than the adjustable spring, being connected to a fixed point on the arm head, and providing a movable member associated with the other end of the adjustable spring so as to adjust the normal distance and thereby adjusting the biasing force on the wiper arm. The step of providing the movable member includes pivotally supporting the movable member and setting the other end of the movable member, at which the movable member is connected to the adjustable spring, at a position providing a predetermined initial biasing force for biasing the wiper blade agaist the associated vehicular window. The predetermined initial biasing force has no component to urge the wiper blade against the associated vehicular window.

BRIEF DESCRIPTION OF THE DRAWINGS

In the drawings:

FIGS. 5 and 6 are diagrams of the wiper device for use in general discussion about the depression force of the wiper blade;

FIG. 7 is a fragmentary illustration of a modified embodiment of the automotive wiper device according to the present invention.

DESCRIPTION OF THE PREFERRED EMBODIMENT

Figure 1:
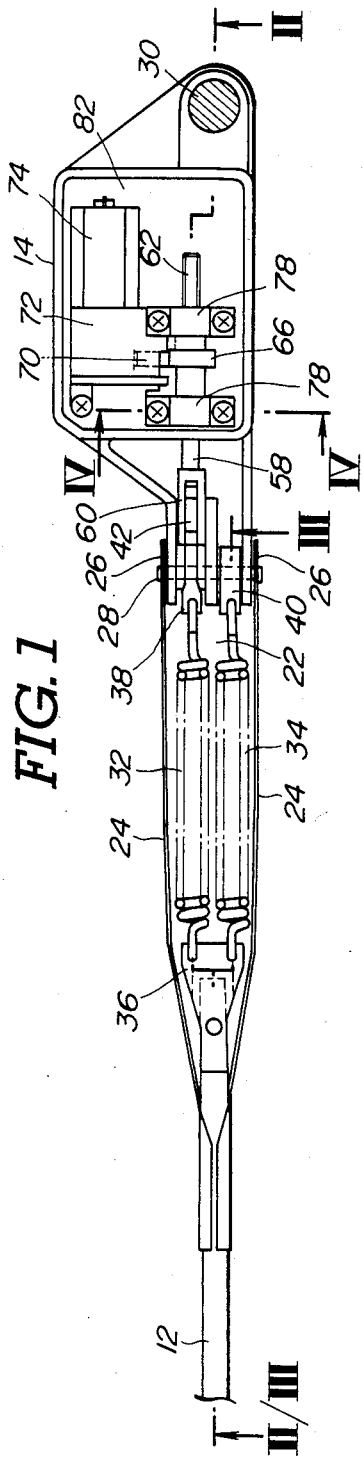
FIG. 1 is a bottom view of the major part of the preferred embodiment of an automotive wiper device according to the present invention.

Referring now to the drawings, particularly to FIGS. 1 to 6, the preferred embodiment of an automotive wiper device generally comprises a wiper blade assembly 10 (shown in FIGS. 5 and 6), a wiper arm 12 and a wiper arm head 14. As generally shown in FIG. 1, the wiper blade assembly 10 includes a rubber wiper blade 16 to contact to a vehicular window surface for wiping rain water, washer liquid and so forth. The rubber wiper blade 16 is fitted to a wiper blade metal 18 The wiper blade metal 18 has a bracket 18a to be pivotally connected to the free end of the wiper arm 12 for pivotal movement about a pivot 20.

The wiper arm 12 is generally U-shaped at the end near the wiper arm head 14, which end of the wiper arm will hereafter be referred to as "arm head end". At the arm head end, the wiper arm 12 has an upper wall section 22 and a pair of side wall sections 24. The side wall sections 24 have extensions 26 extending toward the wiper arm head 14 and pivotally connected to the latter by means of a pivot shaft 28.

The end of the wiper arm head 14 remote from the wiper arm 12 is connected to a drive shaft 30. The drive shaft 30 is designed to be driven by a wiper motor (not shown) which drives to pivot the wiper arm head 14 with the wiper arm 12 and the wiper blade assembly 10 when in operation.

A pair of coil springs 32 and 34 stretch between the wiper arm head 14 and the wiper arm 12. The ends of the coil springs 32 and 34 remote from the wiper arm head 14 are anchored by a bracket 36 which is fixed to the wiper arm 12. The other ends of the coil springs 32 and 34 are connected to spring hooks 38 and 40. The spring hook 38 is connected to one end of an essentially L-shaped actuation lever 42. The actuation lever 42 is pivotally mounted on the wiper arm head 14. On the other hand, the spring hook 40 is connected to a support pin 44 protruding from the side wall section 46 of the wiper arm head 14.

Figure 2:
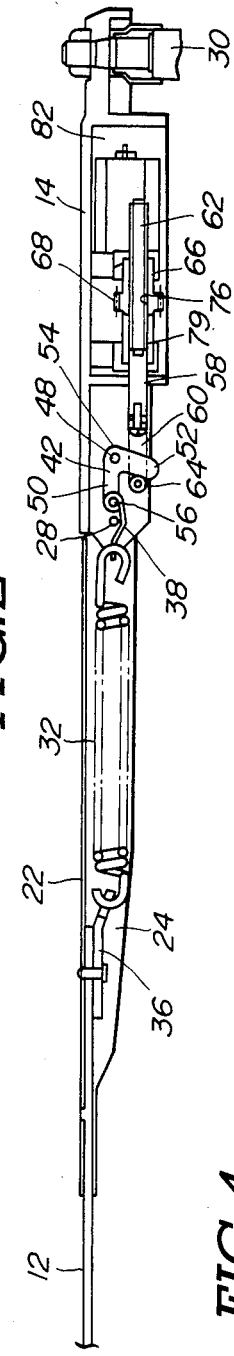
FIG. 2 is a longitudinal section of the major part of the preferred embodiment of the automotive wiper device, as taken along line II—II of FIG. 1.

As shown in FIG. 2, the actuation lever 42 is pivotally supported by means of a pivot shaft 48 for pivotal movement thereabout. As stated previously, the actuation lever 42 is generally L-shaped and consists of a first section 50, to which the spring hook 38 is pivotally connected, and a second section 52. The second section 52 adjoins the first section 50 through an adjoining section 54. The actuation lever 42 is connected to the pivot shaft 48 at the adjoining section 54. The first section 50 of the actuation lever 42 is connected to the pivot shaft 48 at the adjoining section 54. The first section 50 of the actuation lever 42 supports the spring hook 38 by means of a pin 56 extending therefrom. On the other hand, the second section 52 of the actuation lever 42 is connected to a drive rod 58.

As will be appreciated, since the spring hook 38 is constantly subject to the spring force of the coil spring 32, the actuation lever 42 connected to the spring hook 38 is constantly biased clockwise as view in FIG. 2. This biasing force exerted on the actuation lever 42, holds the actuation lever is constant contact with the drive roller 64.

The drive rod 58 has a bifurcated end 60 and a threaded end 62. The bifurcated end 60 of the drive rod 58 supports a drive roller 64 which contacts the second section 52 of the actuation lever 42 for cooperation therewith. On the other hand, a driving gear 66 has external gear teeth 68 engaging an output gear 70 of a reduction gear assembly 72 which is coupled with a wiper servo motor 74. The driving gear 66 also has internal gear teeth 76 in the form of spiral gear teeth engaging the threaded end 62 of the drive rod 58. The drive rod 58 is rotatably supported by means of brackets 78. As clearly shown in FIG. 4, the drive rod 58 has a semi-circular cross-section with a flat keying surface 80. The cross-section of bearing 79 fixed with the brackets 78 conforms to the semi-circular cross-section of the drive rod 58. The bearings 79 thus allow the drive rod 58 to slide axially without rotating as the driving gear 66 rotates.

Figure 3:
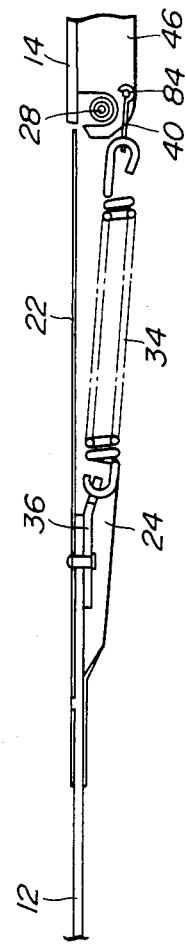
FIG. 3 is a a longitudinal section of the major part of the preferred embodiment of the automotive wiper device, as taken along line III—III of FIG. 1.
Figure 4:
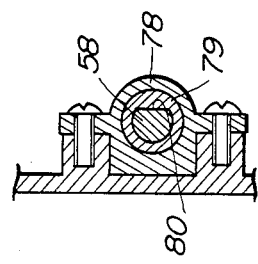
FIG. 4 is a cross-section of the major part of the preferred embodiment of the automotive wiper device, as taken along line IV—IV of FIG. 1.

As can be seen in FIGS. 2 and 3, the driving gear 66, reduction gear assembly 72 and wiper servo motor 74 form a depression force adjusting means housed within a housing space 82 defined within the wiper arm head 14.

The spring hook 40 anchoring the coil spring 34 is pivotally secured to a support pin 84 extending from the side wall section 46 of the wiper arm head 14. Therefore, the compression force of the coil spring 34 is exerted between a point A at the support pin 84 and a point B at the bracket 36. As shown diagrammatically in FIG. 5, assuming the spring load due to the coil spring 34 is W, the length of the wiper arm 12 is L and the component of the distance between the point A and the axis of the pivot 20 perpendicular to the spring axis (i.e. the normal distance) is X, the depression force P exerted on the wiper blade assembly 10 can be expressed by the following equation:

$$P = W(X/L)$$

Similarly, as shown in FIG. 6, assuming the normal distance between the axis of the pivot shaft 48 and the axis of the pivot 20 is $x_1$, the depression force $P_1$ exerted on the wiper blade assembly 10 can be expressed by the following equation:

$$P_1 = W(x_1/L)$$

Preferably, the adjustable component $P_1$ of the total depression force ($=P+P_1$) will drop to zero in the rest position of the driving shaft 58. Toward this end, the initial position of the actuation lever 42 should have the pin 56 colinear with the pivot 20 and the anchor point B, whereby the normal distance $X_1$ drops to zero.

If the actuation lever 42 is pivoted counterclockwise as shown in phantom line FIG. 6, the normal distance between the axis of the pivot shaft 48 and the axis of the pivot 20 changes to a maximum (labelled $x_2$). Although the spring load W will change slightly due to the pivotal movement of the actuation lever 42, this effect is negligible. Therefore, the maximum depression force due to the spring 32 can be expressed by the following equation:

$$P_1 = W(x_2/L)$$

As will be clear herefrom, the depression force will vary as a function of the normal distance between the axis of the pivot shaft 48 and the axis of the pivot 20. Therefore, if the coil spring 32 alone were used to depress the wiper blade against the window surface, the normal distance between the axis of the pivot shaft 48 and the axis of the pivot 20 would have to be relatively large. This would prevent the wiper arm head 14 from being compact.

The shown embodiment thus employs a pair of coil springs 32 and 34. Therefore, when the actuation lever 42 is in its initial position and thus the normal distance $x_1$ between the axis of the pivot shaft 48 and the axis of the pivot 20 is approximately zero, the depression force exerted on the wiper blade assembly 10 by spring 32 will be approximately zero. Pivotting the actuation lever 42 from the initial position to the normal distance to $x_2$ increases the depression due to spring 32 to P. This adjustable depression force is of course in addition to the force exerted on the wiper blade by spring 34. In other words, the sum of the forces P and $P_1$ is exerted on the wiper blade. Therefore, the force $P_1$ due to spring 32 can be relatively small. This helps keep the wiper arm head 14 thin and thus allows the latter to be compact.

In the shown embodiment, the coil spring 34 is fixed between the bracket 36 and the spring hook 40. Therefore, the coil spring 34 constantly exerts a given depression force (P) on the wiper blade assembly. On the other hand, since the actuation lever 42 is designed to pivot in order to adjust the normal distance between $x_1$ and $x_2$, the depression force exerted by the coil spring 32 varies between 0 and P.

In order to allow adjustment of the angular position of the actuation lever 42, the wiper servo motor 74 is connected to a remote control switch (not shown) which is installed within the vehicle cabin. Alternatively, the wiper servo motor 74 can be connected to a controller which detects vehicle driving conditions based on preselected parameters, such as vehicle speed, air pressure on the window surface and so forth. In either case, a control signal is sent to the wiper servo motor 74 to drive the latter. The force of the wiper servo motor 74 is transmitted to the drive gear 66 through the reduction gear assembly 72. The drive gear 66 thus rotates to drive the drive rod 58.

The wiper servo motor 74 is a reversible motor capable of rotating in opposite first and second rotational directions. Driving the wiper servo motor 74 in the first rotational direction causes the drive rod 58 to slide in a first direction away from the actuation lever 42. This causes counterclockwise pivotal movement of the actuation lever 42 which increases the normal distance. Driving the wiper servo motor 74 in the second rotational direction causes movement of the drive rod 58 in a second direction toward the actuation lever 42. This allows the actuation lever 42 to pivot clockwise under the force of the spring 32. Angular displacement of the actuation level 42 varies with the stroke of the drive rod 58, which is varies with the rotation of the wiper servo motor 74 controlled by the control signal.

FIG. 7 shows another embodiment of the automotive wiper device for implementing the present invention. In this embodiment, a straight lever 90 is employed as a replacement for the L-shaped actuation lever 42 in the previous embodiment. The straight lever 90 is connected to the spring hook 38 at its free end. The straight lever 90 is pivotably mounted on the wiper arm head 14 by way of a pivot shaft 92 at its other end.

A pusher screw 94 opposes one transverse edge of the straight lever 90. The pusher screw 94 engages a threaded hole 96 through the wiper arm head wall 98. The pusher screw 94 may be driven manually toward and away from the opposing transverse edge of the straight lever 90. Alternatively, the pusher screw 94 can be driven by an appropriate servo mechanism to allow remote control of its axial position.

With this construction, the angular position of the straight lever 90 can be adjusted by axial displacement of the pusher screw 94. Angular displacement of the straight lever 90 changes the normal distance between the axis of the pivot shaft 48 and the axis of the pivot 20.

This embodiment will held simplify the depression force adjusting mechanism to a greater extent than in the former embodiment.

It should be appreciated that the number of the springs used to generate the depression force on the wiper blade assembly is not limited to two. Therefore, the present invention should be understood to include embodiments which includes more than two springs.

What is claimed is:

1. An automotive wiper device with adjustable depression force comprising;
   a wiper blade;
   a wiper arm supporting said wiper blade at one end;
   an arm head connected to the other end of said wiper arm for pivotally driving said wiper arm so as to actuate the wiping operation.
   a bias means, connected to said wiper arm and said arm head, for biasing said wiper arm and said wiper blade toward an associated vehicular window surface, said biasing means comprising a plurality of springs exerting a biasing force on said wiper arm, said plurality of springs including at least one adjustable spring; and
   adjusting means, cooperating with said adjustable spring, for adjusting the biasing force exerted by said adjustable spring.

2. An automotive wiper device as set forth in claim 1, wherein each of said springs is connected at one end to a fixed point on said wiper arm and connected at the other end to said arm head, the other end of said springs other than said adjustable spring, being connected to a fixed point on said arm head, and wherein said adjusting means comprises a movable member associated with said other end of said adjustable spring so as to for adjusting the normal distance and thereby adjusting said biasing force on said wiper arm.

3. An automotive wiper device as set forth in claim 1, wherein said movable member of said adjusting means is pivotally supported by said arm head.

4. An automotive wiper device as set forth in claim 3, wherein said adjusting means further comprises an actuation means associated with said movable member for causing pivotal movement of said movable member.

5. An automotive wiper device as set forth in claim 4, wherein said movable member comprises an essentially L-shaped lever pivoted at the juncture of essentially straight first and second sections, said first section being connected to said other end of said adjustable spring and said second section being connected to said actuation means.

6. An automotive wiper device as set forth in claim 5, wherein said actuation means comprises a driving motor and a rod member adapted to be driven axially so as to actuate said second section of said L-shaped lever pivotally.

7. An automotive wiper device as set forth in claim 6, wherein said actuation means further comprises a converter means for converting the rotational driving force of said driving motor into energy for driving said rod member axially.

8. An automotive wiper device as set forth in claim 4, wherein said movable member comprises a straight lever pivotably secured to said arm head at one end and connected at the other end to said other end of said adjustable spring.

9. An automotive wiper device as set forth in claim 8, wherein said actuation means comprises a driver screw, threaded into said arm head and in contact with one edge of said straight lever, for adjusting said straight lever position by axially movement through said arm head.

10. A method for adjusting depression force to be exerted on a wiper brake in an automotive wiper device comprising said wiper blade, a wiper arm supporting said wiper blade at one end, an arm head connected to the other end of said wiper arm for pivotally driving said wiper arm so as to actuate the wiping operation, and a bias means, connected to said wiper arm and said arm head, for biasing said wiper arm and said wiper blade toward an associated vehicular window surface, which method comprises:
   providing a plurality of springs in said biasing means, said plurality of springs including at least one adjustable spring;
   exerting a biasing force on said wiper arm for depressing said wiper blade against said associated vehicular window by means of said plurality of springs; and
   adjusting the biasing force exerted by said adjustable spring.

11. A method as set forth in claim 10, which further comprises a step of connecting each of said springs at one end to a fixed point on said wiper arm and connected at the other end to said arm head, said the other end of said springs other than said adjustable spring, being connected to a fixed point on said arm head, and providing a movable member associated with said other end of said adjustable spring so as to adjust the normal distance and thereby adjusting said biasing force on said wiper arm.

12. A method as set forth in claim 10, orth in claim 1, wherein said step of providing said movable member includes pivotally supporting said movable member and setting said other end of said movable member, at which said movable member is connected to said adjustable spring, at a position providing a predetermined initial biasing force for biasing said wiper blade against said associated vehicular window.

13. A method as set forth in claim 12, wherein said predetermined initial biasing force has no component to urge said wiper blade against said associated vehicular window.

* * * * *